(12) United States Patent
Hubin et al.

(10) Patent No.: US 9,016,072 B2
(45) Date of Patent: Apr. 28, 2015

(54) METHOD FOR CONTROLLING A COMPOSITE DEVICE AND A COMPOSITE DEVICE IN WHICH THE METHOD CAN BE APPLIED

(75) Inventors: Kristof Pascal Hubin, Mechelen (BE); Kris Van Campfort, Aartselaar (BE)

(73) Assignee: Atlas Copco Airpower N.V., Wilrijk (BE)

( * ) Notice: Subject to any disclaimer, the term of this patent is extended or adjusted under 35 U.S.C. 154(b) by 74 days.

(21) Appl. No.: 13/512,742

(22) PCT Filed: Nov. 30, 2010

(86) PCT No.: PCT/BE2010/000081
§ 371 (c)(1),
(2), (4) Date: May 30, 2012

(87) PCT Pub. No.: WO2011/066629
PCT Pub. Date: Jun. 9, 2011

(65) Prior Publication Data
US 2012/0266611 A1   Oct. 25, 2012

(30) Foreign Application Priority Data
Dec. 2, 2009  (BE) .................................. 2009/0787

(51) Int. Cl.
*F25D 3/12*     (2006.01)
*F04C 29/04*    (2006.01)
*F04C 28/00*    (2006.01)
(Continued)

(52) U.S. Cl.
CPC ................. *F04D 27/02* (2013.01); *Y02B 30/18* (2013.01); *F04C 29/04* (2013.01); *F04C 28/00* (2013.01); *F24D 17/0005* (2013.01);
(Continued)

(58) Field of Classification Search
CPC ............ F25B 1/00; F25B 29/00; F25B 27/00; F25D 29/00
USPC .......... 62/56, 126, 129, 426; 34/282, 526, 86, 34/468
See application file for complete search history.

(56) References Cited

U.S. PATENT DOCUMENTS 4,122,611 A * 10/1978 Marchal et al. ................... 34/73
4,279,574 A    7/1981 Kunderman
(Continued)

FOREIGN PATENT DOCUMENTS

CN     201407781 Y    2/2010
EP       1972858 A2   9/2008
(Continued)

OTHER PUBLICATIONS

International Search Report for PCT/BE2010/000081 dated Aug. 18, 2011.
(Continued)

*Primary Examiner* — Mohammad M Ali
(74) *Attorney, Agent, or Firm* — Bacon & Thomas, PLLC

(57) ABSTRACT

Method for controlling a device that includes at least a compressor installation and/or a drying device and a heat recovery system. The heat recovery system absorbs heat from the compressor installation, and the device further includes a controller and device for determining one or more system parameters. The controller controls both the compressor installation and/or the drying device and the heat recovery system on the basis of the system parameters, so that the overall efficiency of the device is optimized.

19 Claims, 1 Drawing Sheet

(51) Int. Cl.
*F24D 17/00* (2006.01)
*F04D 27/02* (2006.01)
*F28D 15/00* (2006.01)
*F28F 27/02* (2006.01)
*F04D 29/58* (2006.01)

(52) U.S. Cl.
CPC .............. *F28D 15/00* (2013.01); *F28F 27/02* (2013.01); *F04D 29/5826* (2013.01)

(56) References Cited

U.S. PATENT DOCUMENTS

| | | | | |
|---|---|---|---|---|
| RE31,633 E | * | 7/1984 | Lewis | 34/381 |
| 5,119,571 A | * | 6/1992 | Beasley | 34/446 |
| 5,983,651 A | * | 11/1999 | Huang | 62/152 |
| 6,203,859 B1 | * | 3/2001 | Scheufler et al. | 427/475 |
| 7,504,784 B2 | * | 3/2009 | Asada et al. | 318/51 |
| 7,624,514 B2 | * | 12/2009 | Konabe et al. | 34/86 |
| 7,669,350 B2 | * | 3/2010 | Yoo et al. | 34/495 |
| 7,676,953 B2 | * | 3/2010 | Magill | 34/282 |
| 7,698,911 B2 | * | 4/2010 | Mills et al. | 68/12.02 |
| 8,276,292 B2 | * | 10/2012 | Bringewatt et al. | 34/443 |
| 2005/0268625 A1 | | 12/2005 | Sienel et al. | |
| 2007/0017113 A1 | * | 1/2007 | Scharpf et al. | 34/86 |
| 2009/0250203 A1 | | 10/2009 | Ida | |
| 2009/0320477 A1 | | 12/2009 | Juchymenko | |

FOREIGN PATENT DOCUMENTS

| | | |
|---|---|---|
| JP | 2004-236965 A | 8/2004 |
| JP | 2005308344 A | 11/2005 |
| WO | 2008106774 A1 | 9/2008 |

OTHER PUBLICATIONS

Japanese Office Action dated Jul. 15, 2014, for JP 2012-541285, and English translation thereof.

* cited by examiner

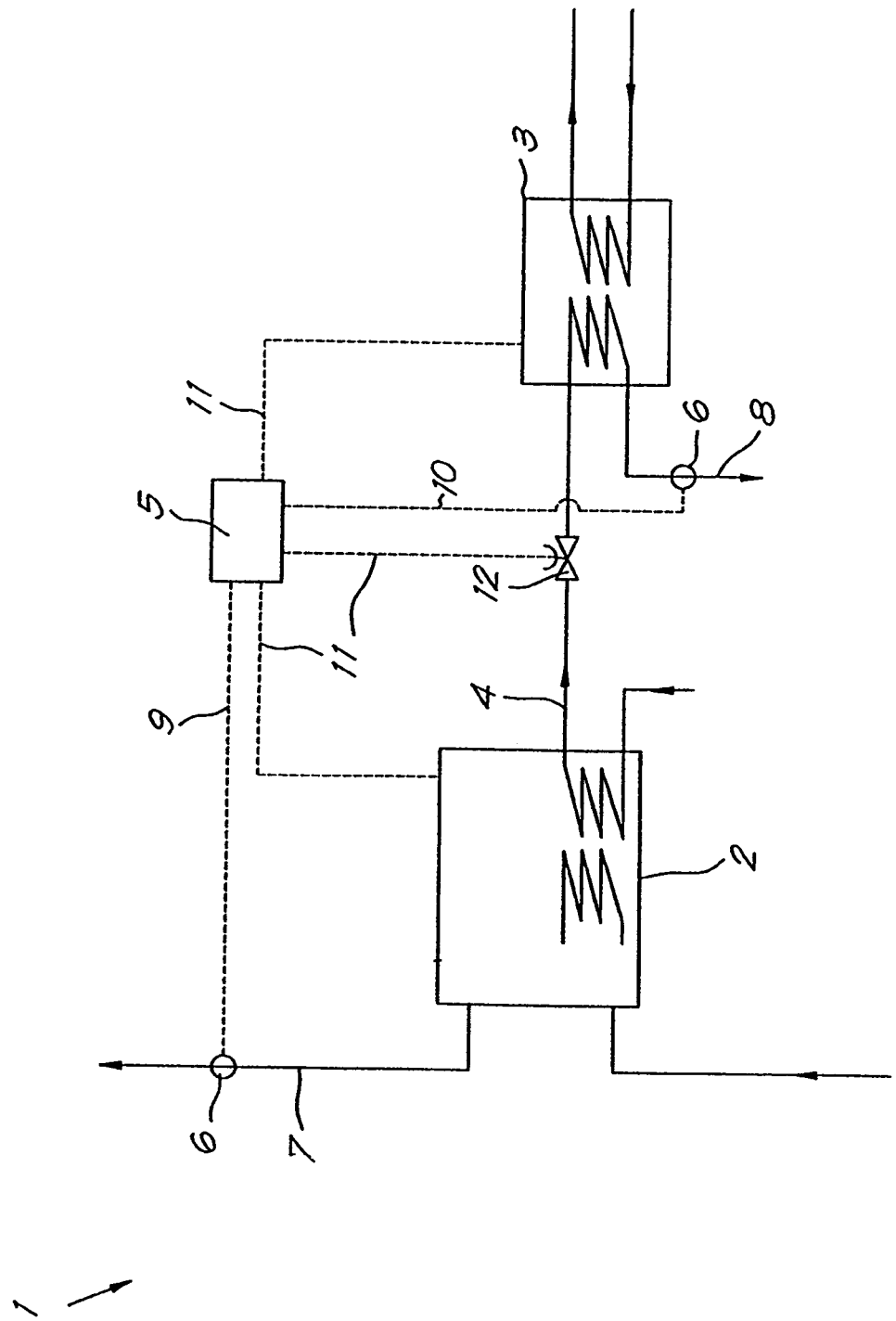

METHOD FOR CONTROLLING A COMPOSITE DEVICE AND A COMPOSITE DEVICE IN WHICH THE METHOD CAN BE APPLIED

BACKGROUND OF THE INVENTION

A. Field of the Invention

The present invention relates to a method for controlling a composite device and a composite device in which this method can be applied.

B. Related Art

More specifically the invention is intended to control a composite device that comprises at least a compressor installation, e.g., a compressor device, and/or drying device and a heat recovery system.

It is known that the compression of gas in a compressor installation is coupled with enormous heat generation.

Compressor installations are known with energy recovery means to recuperate this heat as efficiently as possible.

Traditionally compressors have been equipped with a basic regulation with the aim of controlling the compressor according to the demanded quantity of compressed air.

In known devices the coolant flow is controlled by means of a thermostatic valve on the output of the cooling circuit. It is thereby possible to control the flow of coolant such that the temperature at the output of the cooling circuit remains constant and is equal to a preset value.

When using a thermostatic valve, this preset value is a fixed value and it cannot be adjusted according to the heat consumption.

The temperature at the output of the cooling circuit will then always be the same, irrespective of the quantity of heat absorbed by the coolant.

A disadvantage is that neither the efficiency of the compressor installation nor the efficiency of the entire composite system is optimised.

Due to the absence of any form of optimisation, the composite device will then be subject to temperature fluctuations, for example.

Such temperature fluctuations are often undesirable and can also bring about premature wear of the device.

WP 2008/106774 describes a control of a system for recovering heat from a gas engine and converting heat into electricity. No account is taken here of the extent to which the optimisation of the heat recovery circuit affects the efficiency and reliability of the gas engine itself.

SUMMARY OF THE DISCLOSURE

The purpose of the present invention is to provide a solution to one or more of the aforementioned disadvantages and/or other disadvantages, by providing a method for controlling a composite device that comprises at least a compressor installation and/or drying device on the one part, and a heat recovery system on the other part, whereby the heat recovery system absorbs heat from the compressor installation and/or drying device, whereby the composite device further comprises a controller and means for determining one or more system parameters of both the compressor installation and/or the drying device, and the heat recovery system, whereby the aforementioned system parameters are indicative of the part-efficiency of the compressor installation and/or drying device and the heat recovery system respectively, and whereby the controller controls both the compressor installation and/or the drying device and the heat recovery system on the basis of the aforementioned system parameters, such that the overall efficiency of the composite device is optimised.

The present invention also relates to a composite device that consists of, on the one part, a compressor installation and/or drying device, and on the other part a heat recovery system for recovering heat from the compressor installation and/or drying device, whereby the aforementioned composite device also comprises means for determining one or more system parameters of both the aforementioned compressor installation and/or drying device and the heat recovery system, whereby the aforementioned system parameters are indicative of the part-efficiency of the compressor installation and/or drying device and the heat recovery system respectively, and whereby the aforementioned means are connected to a controller that controls both the compressor installation and/or drying device and the heat recovery system, on the basis of the aforementioned system parameters such that the overall efficiency of the composite device is optimised.

An advantage is that the method allows optimum overall efficiency to be realised by influencing both the control of the compressor installation, e.g., the compressor device, and/or drying device, and the heat recovery system, all such that the total energy consumption of the composite device is substantially reduced.

The overall efficiency not only means the energy efficiency here, but can for example also include the economic efficiency.

In order to be able to monitor the overall efficiency, the controller preferably uses certain settings from a user of the composite device, such as the cost of electricity, the cost of fuel for producing heat and/or similar. At each operating point of the composite device the overall efficiency is evaluated on the basis of the specified system parameters and the settings of the user.

Another advantage is that the control of the compressor device and/or drying device and the heat recovery system can be attuned to one another.

An advantage attached to this is that the composite device can be better protected against many undesired factors, such as excessively high temperatures or large temperature fluctuations of the coolant or similar.

By avoiding the occurrence of all these undesired factors, the wear of the composite device is limited as much as possible and the lifespan of the composite device can thus be increased.

It is clear that the combination of the two controls opens up perspectives for a number of control methods that cannot be realised if only the compressor device is controlled.

DESCRIPTION OF THE DRAWINGS

With the intention of better showing the characteristics of the invention, a preferred embodiment is described hereinafter by way of an example, without any limiting nature, of a composite device according to the invention, and a preferred method according to the invention, with reference to the sole accompanying drawing.

DETAILED DESCRIPTION OF PREFERRED EMBODIMENTS OF THE INVENTION

The aforementioned drawing shows a composite device 1, which in this case primarily consists of a compressor installation, which can be a compressor device 2, and a heat recovery system 3.

As is known, the compressor device 2 can have a housing with a compressor element in it that is driven by an electric motor.

Furthermore, the compressor device 2 generally has a cooling system 4.

According to the invention the composite device 1 also has a controller 5, that is preferably constructed as a separate electronic component.

Again according to the invention, means 6 are provided that enable one or more system parameters to be determined.

These means 6 can for example comprise temperature sensors, pressure sensors, etc, and can for example be located at the outlet 7 of the compressed gas and/or the output 8 of the cooling circuit.

Preferably these means 6 are connected to the controller 5 by electrical cables 9-10.

The method according to the invention is very simple and as follows.

In the first instance a criterion to be optimised has to be selected by a user.

This criterion can be pre-programmed in the electronic controller 5, but this is not a requirement for the invention described.

During the operation of the composite device 1, one or more system parameters can be measured or determined continuously and/or at regular points in time by the means 6 for determining the system parameters.

The measured and/or determined parameters are preferably sent to the controller 5 via the data links 9 and 10 provided for this purpose.

On the basis of the measured system parameters, the controller 5 can send signals to both the compressor device 2 and the heat recovery system 3 via electrical control cables 11.

The signals that the controller 5 sends thereby depend on the chosen criterion, as well as the measured and/or determined system parameters.

It goes without saying that the controller 5 can also include an algorithm that processes the different measured and/or determined system parameters into an overall system parameter, and that this last-mentioned overall system parameter is optimised according to the set criterion.

The highest possible efficiency of the composite device 1 is chosen as a criterion for the composite device 1 according to the invention.

In this case there can be an algorithm in the controller 5 that determines the operating points of the compressor device 2 as a function of the total efficiency of the compressor device 2 and the heat recovery system 3.

The algorithm can hereby be based on the measured data of the compressor device 2 and/or the heat recovery system 3.

In a practical embodiment of the invention the controller 5 can for example control the position of a valve 12 that affects the cooling water flow, whereby this valve 12 can for example be opened gradually such that continuous adjustment of the flow of cooling water is realised. Nevertheless, a sudden and/or stepwise opening and closing of such a valve is not ruled out.

Thus in this example, in the event of a small increase in the cooling water flow, the compressor device 2 is cooled better, while at that same time there can be a greater demand for energy.

When the aforementioned decrease of energy consumption in the compressor device 2 is less than the increase of the energy consumption in the heat recovery system 3, the total energy consumption of the entire device 1 will decrease and thus the overall efficiency of the composite device 1 is optimised.

Another example is the occurrence of an increase of the flow rate of coolant in periods when there is no demand for energy from the heat recovery system 3.

In these circumstances the flow rate of coolant must not be decreased in order to bring about a high output temperature in the composite device 1, and consequently in this case the total energy consumption of the composite device 1 will be reduced thanks to the controlled operation of the composite device 1.

An additional criterion that may be selected to control the composite device 1 is for example an increase in the lifetime and/or increase in the reliability of the composite device 1.

After all it is generally known that frequent or large temperature variations or an excessively high output temperature can cause immediate damage to the device and/or premature wear of these components.

In order to optimise the lifespan, the algorithm can be set such that large temperature fluctuations remain limited and occur as little as possible, all such that the temperature in the composite device 1 remains within a safe operating zone at all times.

It is clear that such control is possible by controlling both the compressor device 2 and the heat recovery system 3.

Another practical example in which the method according to the invention can be applied is a composite device 1 with a compressor device 2 and a boiler.

The flow of the water that flows through the boiler generally depends on the demand for steam.

When there is a variation in the demand for steam, the requirement for hot water for heating the water in the boiler will also vary.

The application of the method according to the invention enables the water temperature to be controlled as a function of a selected criterion of the composite device 1, and according to the invention this criterion consists of optimising the overall efficiency of the composite device 1.

As a possible additional criterion it can be chosen that the compressed gas is always cooled such that hot water is always available so that the steam production in the boiler can increase at any time.

Another possible additional criterion may be that the compressed gas is cooled as efficiently as possible, even when there is little or no demand for steam production.

Another practical example in which the method according to the invention can be applied, is the heating of water for a sanitary system by means of the heat from the compressor device 2.

In a heat recovery system for sanitary systems such as showers, there will generally not be a constant demand for hot water, but the consumption of hot water will be rather periodic.

There can thus be a temporary very high demand for hot water, for example when a user takes a shower.

Through the application of the method according to the invention, the temperature of the coolant in the compressor can be controlled such that the compressed gas is cooled and the water for the sanitary system is heated only when there is a demand for hot water in the shower.

As a result, the method according to the invention enables the regulation to be adjusted such that the compressed gas is cooled as efficiently as possible when there is no or only a limited demand for hot water in the sanitary system.

Of course the application of the heat recovery system described above is not limited to heating pure water for sanitary systems, but can also be used to heat a mixture of water and glycol for example, or more generally any other liquid or other mixture of liquids and/or any gas or mixture of gases.

In the aforementioned way the benefit is obtained that the overall efficiency of the composite device 1, i.e. the sanitary system 3 and the compressor device 2 together, is improved.

In a further practical embodiment of a composite device 1 according to the invention, the compressor device is speed controlled and the rotation speed of this compressor device 2 is determined by the set point for the pressure of the compressed gas at the outlet of the compressor device 2 and a certain pressure range around it. As a result the controller 5 can control the said rotation speed on the basis of what is happening in the heat recovery system, and for example allow temporarily a greater pressure range around the set point.

The specific consumption of the compressor device 2 after all also depends on the rotation speed. Even though this may result in higher electricity consumption, the quantity of energy recuperated will also increase such that a saving in fuel costs is possible.

It is clear that the notion of a compressor installation 2 can refer to a single compressor device or a compressor group with a number of compression stages.

Of course the compressor group can be a group of compression stages connected in series as well as a parallel connection of a number of compressors and/or combinations of them.

The invention is not limited either to composite devices 1 that comprise a combination of the compressor installation and a heat recovery system 3, but also relates to a composite device that comprises a combination of a drying device and a heat recovery system 3, as in this last case the heat generated in the drying device can be recovered by means of the heat recovery system 3.

In each of the applications described above, the compressor installation 2 can be replaced by a drying device or by a combination of a compressor installation 2 with such a drying device.

The present invention is by no means limited to the embodiments described as an example and shown in the drawings, but a method according to the invention for controlling a composite device and a composite device in which this method can be applied, can be realised in all kinds of variants, without departing from the scope of the invention.

The invention claimed is:

1. A method for controlling a composite device that includes a gas compressor installation and a heat recovery system; the composite device further comprising a controller and a parameter determining device that determines one or more system parameters of both the gas compressor installation and the heat recovery system; comprising the steps:
    absorbing heat from the gas compressor installation and using said absorbed heat in the heat recovery system;
    using said system parameters as an indication of the partial efficiency of the gas compressor installation and the heat recovery system, respectively; and
    controlling via the controller both the gas compressor installation and the heat recovery system on the basis of the system parameters in a manner such that the overall efficiency of the composite device is optimised.

2. The method according to claim 1, further comprising the step selecting a criterion to be optimized.

3. The method according to claim 2, wherein the criterion is a cost of electricity or cost of fuel.

4. The method according to claim 1, further comprising the step of controlling a rotational speed of the gas compressor installation based on a system parameter of the heat recovery system.

5. The method according to claim 1, wherein the controlling of the gas compressor installation comprises adjusting a rotational speed of the gas compressor installation based on a system parameter of the heat recovery system.

6. The method according to claim 1, further comprising the steps absorbing heat from the gas compressor installation and transferring said absorbed heat from the gas compressor installation to the heat recovery system to heat a fluid.

7. The method according to claim 6, wherein the heated fluid is used in a sanitary system.

8. The method according to claim 6, wherein the heat recovery system is a boiler and steam is produced in the boiler by heating said fluid.

9. A composite device comprising:
    a gas compressor installation and a heat recovery system configured in a way to recover heat from the gas compressor installation for heating in the heat recovery system,
    said composite device comprising a parameter determining device that determines one or more system parameters of both the gas compressor installation and the heat recovery system;
    said system parameters being selected to indicate the partial efficiency of the gas compressor installation and the heat recovery system respectively;
    the parameter determining device being connected to a controller that is configured to control both the gas compressor installation and the heat recovery system, on the basis of the system parameters in a manner such that the overall efficiency of the composite device is optimised.

10. The composite device according to claim 9, wherein the heat recovery system comprises a system that heats a fluid using said heat from the gas compressor installation.

11. The composite device according to claim 9, further comprising a cooling system configured in a way to absorb heat from the gas compressor installation and transfer said absorbed heat from the gas compressor installation to heat a fluid in the heat recovery system.

12. The composite device according to claim 11, wherein the cooling system comprises cooling water.

13. The composite device according to claim 10, wherein the heated fluid is water.

14. The composite device according to claim 13, wherein the heat recovery system comprises a sanitary system configured in a way to use said heated water.

15. The composite device according to claim 10, wherein the heat recovery system is a boiler, said boiler being configured in a way to produce steam.

16. The composite device according to claim 9, wherein at least one of the system parameters is a system parameter of the heat recovery system, and said system parameter is used to adjust a speed of the gas compressor installation.

17. The composite device according to claim 9, wherein the parameter determining device comprises at least one of a temperature sensor and a pressure sensor.

18. A composite device comprising:
    a drying device and a heat recovery system, wherein said heat recovery system is configured in a way to recover heat from the drying device, said heat being used in a process separate from the drying device,
    said composite device comprising a parameter determining device that determines one or more system parameters of both the drying device and the heat recovery system;
    said system parameters being selected to indicate the partial efficiency of the drying device and the heat recovery system respectively;
    the parameter determining device being connected to a controller that is configured to control both the drying device and the heat recovery system, on the basis of the system parameters in a manner such that the overall efficiency of the composite device is optimised.

19. The composite device of claim 18, further comprising a cooling system configured in a way to absorb heat from the drying device and transfer said absorbed heat from the drying device to heat a fluid in the heat recovery system.

* * * * *